(12) United States Patent
Nakra et al.

(10) Patent No.: US 11,580,025 B1
(45) Date of Patent: Feb. 14, 2023

(54) CACHE PREFETCHING WITH DYNAMIC INTERLEAVING CONFIGURATION MODIFICATION

(71) Applicant: ADVANCED MICRO DEVICES, INC., Santa Clara, CA (US)

(72) Inventors: Tarun Nakra, Austin, TX (US); Akhil Arunkumar, Santa Clara, CA (US); Vydhyanathan Kalyanasundharam, Santa Clara, CA (US); Chintan S. Patel, Austin, TX (US); Nithesh Kurella Lakshmi Narayanamurthy, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/490,529

(22) Filed: Sep. 30, 2021

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| 7,353,339 | B2 * | 4/2008 | Komarla | G06F 12/0862 711/158 |
| 10,001,927 | B1 * | 6/2018 | Trachtman | G06F 3/0688 |
| 2008/0183903 | A1 * | 7/2008 | VanStee | G06F 13/161 710/5 |
| 2013/0185475 | A1 * | 7/2013 | Talagala | G06F 12/0866 711/102 |
| 2019/0212934 | A1 * | 7/2019 | Chopra | G06F 3/0683 |
| 2021/0157730 | A1 * | 5/2021 | Hornung | G06F 12/0862 |

* cited by examiner

*Primary Examiner* — William E. Baughman

(57) ABSTRACT

Systems and methods for coordinated memory-side cache prefetching and dynamic interleaving configuration modification involve modifying one or both of the prefetch distance or the prefetch degree used by prefetcher modules of one or more memory-side caches by modifying interleaving configuration data following detection of an interleaving reconfiguration trigger condition indicative, for example, of low prefetch accuracy, low prefetch coverage, high prefetch lateness, or a combination of these. In response an interleaving reconfiguration trigger condition, a processor modifies the interleaving configuration data for the processing system based on the prefetch performance characteristics associated with the interleaving reconfiguration trigger condition. In some embodiments, the interleaving configuration data is modified by changing which physical memory address indices are used to determine the bits that define the channel identification number to which that physical memory address is to be mapped.

20 Claims, 5 Drawing Sheets

CACHE PREFETCHING WITH DYNAMIC INTERLEAVING CONFIGURATION MODIFICATION

BACKGROUND

To improve overall processing efficiency, processing systems typically employ multi-channel high bandwidth memory, such as multi-channel Dynamic Random Access Memory (DRAM). For example, such multi-channel memories are often implemented in a processing system such that multiple memory die are accessible in parallel by a host processor in the system. This multi-channel, parallel access typically increases the amount of data that the system is able to read or write in a given time period, allowing for reduced processing delays that in turn increase system performance.

Multi-channel memory systems are typically configured to store data across multiple memory devices according to an interleaving pattern. Some conventional multi-channel memory systems only utilize a single, static interleaving pattern, according to which data is sequentially stored across the memory devices of the multi-channel memory system, which typically constrains the timeliness, accuracy, and coverage achievable during cache prefetching.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Conventional processing systems sometimes include a main memory to which one or more memory-side caches are communicatively coupled. In accordance with various embodiments of the present disclosure, such memory-side caches are used to prefetch and store data from one or more respective memory devices of the main memory. Prefetching into memory-side caches in this way can improve performance of the processing system by reducing the latency of memory access requests to the main memory. However, prefetches issued by a memory-side cache are typically less timely than prefetches issued by cores of the processing system (i.e., core-initiated prefetches). In order to account for the comparative timeliness inefficiencies of prefetching using memory-side caches, it is sometimes beneficial to prefetch multiple lines (i.e., "cache lines") ahead of the line presently requested via the demand access stream of the processing system. The particular interleaving configuration used by a processing system restricts the prefetch distance and prefetch degree that are achievable for prefetches executed by memory-side caches. Various embodiments of the processing systems described herein coordinate memory-side cache prefetching with dynamic interleaving configuration modification. In some embodiments, a processing system dynamically modifies its interleaving configuration during a boot sequence based on one or more previously-identified prefetch performance characteristics (identified, for example, during at least one period of operation of the processing system that precedes that boot sequence). In some embodiments, the prefetch performance characteristics include, but are not limited to, any of frequency of late prefetches, prefetch coverage, and prefetch accuracy. By implementing the dynamic interleaving configuration modification techniques described herein in coordination with memory-side cache prefetching, a processing system is able to dynamically adjust the prefetch distance, the prefetch degree, or both achievable by the memory-side caches based on observed prefetch performance characteristics, thereby improving prefetch performance of the memory-side caches.

Figure 1:
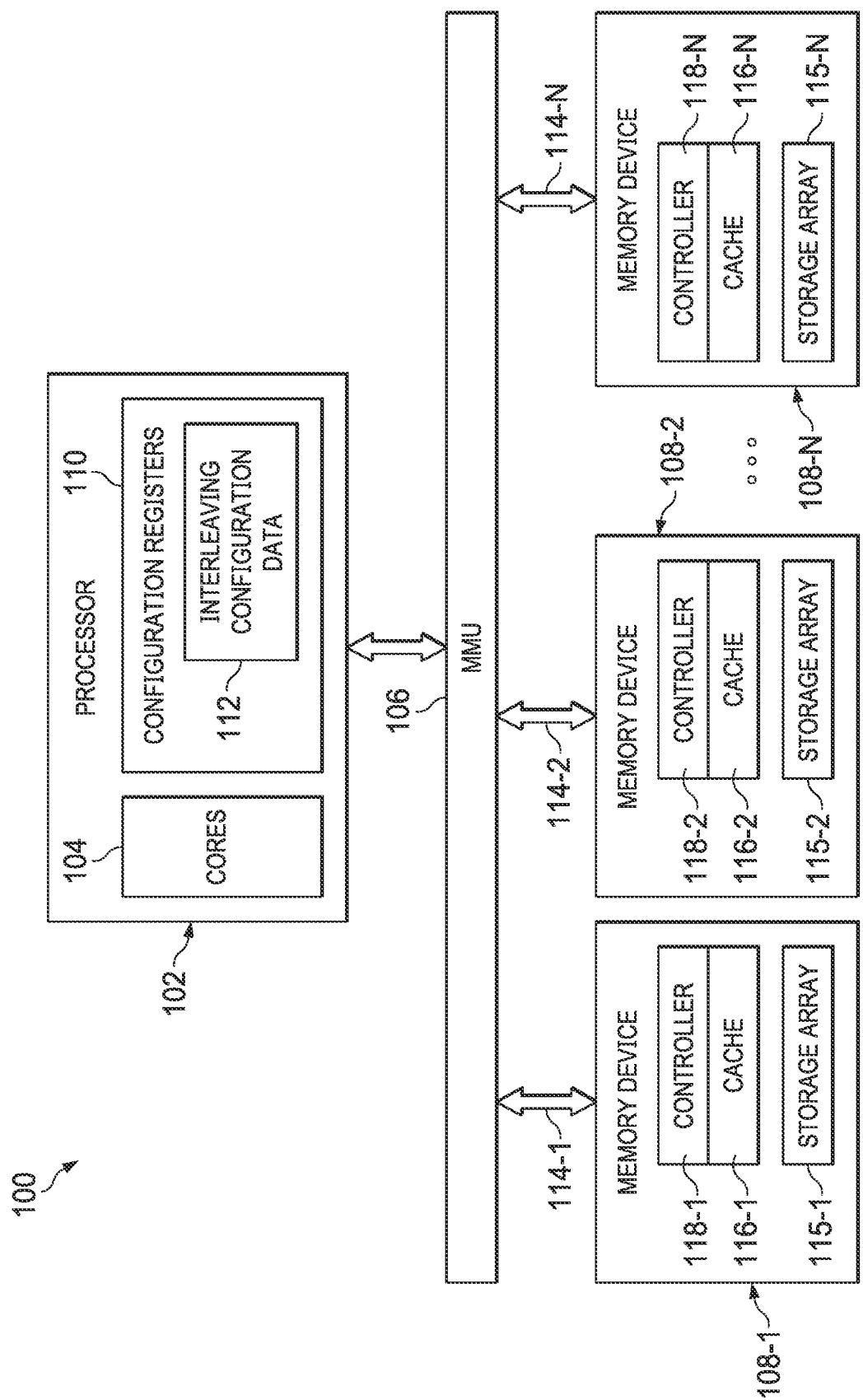
FIG. 1 is a block diagram of a processing system that includes a multi-channel memory system having respective memory-side caches for each channel and that employs dynamic interleaving configuration modification to change an interleaving configuration of the processing system based on prefetch performance characteristics, in accordance with some embodiments.

FIG. 1 illustrates a processing system 100 that is configured for coordinating dynamic interleaving configuration modification of the processing system with memory-side cache prefetching performed by memory-side caches of the processing system. The processing system 100 includes one or more processors 102 having cores 104 and configuration registers 110, one or more memory management units (MMUs) 106, and memory devices 108 (e.g., DRAM devices) that include respective storage arrays 115, memory-side caches 116 and cache controllers 118. As shown, the processor 102 is communicatively coupled to the memory devices 108 via the MMU 106, though in some embodiments multiple MMUs 106 are included, each connecting a different subset of the memory devices 108 to the processor 102.

The MMU 106 services memory access requests provided by the processor 102, providing read/write access to the memory devices 108 and translating physical memory addresses provided in the memory access requests into physical memory locations (e.g., memory blocks) of one or more corresponding memory devices of the memory devices 108 via channels 114. In order to translate the physical memory addresses provided in such memory access requests, each MMU 106 references the interleaving configuration (as defined in the interleaving configuration data 112, for example) to determine which channel 114 the physical memory address should be mapped to. It should be understood that physical address mapping, as used herein, does not refer to the mapping between virtual addresses and physical addresses, but instead refers to mapping between physical addresses and channels and/or physical memory locations of a given processing system. Herein, the terms "physical address" and "physical memory address" are used interchangeably to refer to an address that points to or is otherwise associated with a particular physical memory location of a memory device (e.g., a physical location within one of the storage arrays 115 of the memory devices 108).

The configuration registers 110 of the processor 102 store interleaving configuration data 112, which defines an interleaving configuration for the processing system 100. In some embodiments, an interleaving configuration (i.e., a "memory channel interleaving configuration") refers to a pattern according to which a processing system allocates physical memory addresses across multi-channel memory devices, such as the memory devices 108 (which, in some examples, are multi-channel DRAM devices). The processing system 100 is able to utilize any of a variety of interleaving configurations, with a particular interleaving configuration defining the number of sequential bytes that are to be mapped (according to the physical address mapping) to a particular channel 114 and memory device 108 before switching to map bytes to a different channel 114 and memory device 108. Here, mapping sequential bytes to a channel corresponds to mapping a sequential group of physical memory addresses to that channel. In this way, a set of sequential bytes of data associated with a set of sequential physical memory addresses will be stored and retrieved from the memory devices 108 via different ones of the memory channels 114, and the different bytes of data of the set are stored, in an interleaved fashion, at different corresponding ones of the memory devices 108.

Interleaving configurations that map comparatively smaller groups of sequential bytes to each channel are sometimes characterized as "fine-grain" or "low order" interleaving configurations. Interleaving configurations that map comparatively larger groups of sequential bytes to each channel are sometimes characterized as "coarse-grain" or "high order" interleaving configurations.

Each respective memory-side cache 116 stores a portion of the data that is prefetched from the storage array 115 of a corresponding memory device 108 by a prefetcher module (not shown) of the corresponding cache controller 118. For example, the cache controller 118-1 includes a first prefetcher module that is configured to prefetch data from the storage array 115-1 of the memory device 108-1 and to store the prefetched data in the first memory-side cache 116-1. In some embodiments, the memory devices 108 are the main memory of the processing system 100. During operation, the processor 102 typically generates a demand access stream that includes multiple memory access requests directed to the memory devices 108. The prefetcher modules of the cache controllers 118 are configured to prefetch data (e.g., lines of data) ahead of the demand access stream (e.g., ahead of the most recently issued memory access request,) in an attempt to store the prefetched data in the memory-side caches 116 before the prefetched data is requested by the processor 102. Memory-side cache prefetching using the memory-side caches 116 in this way is typically able to fulfill memory access requests from the processor 102 faster than is possible to fulfill memory access requests from the storage arrays 115 of the memory devices 108 directly, thereby improving performance of the processing system 100 by reducing the effective latency of memory access requests directed to the storage arrays 115 of the memory devices 108.

Metrics that characterize the quality with which prefetching is performed include prefetch coverage, prefetch accuracy, prefetch timeliness, and prefetch lateness. Such metrics are sometimes referred to herein as "prefetch performance characteristics". Prefetch coverage is typically calculated as a fraction of the number of cache misses that are eliminated due to prefetching to the total number of cache misses (measured over a given period, for example). Prefetch accuracy is indicative of the total number of prefetches made that were useful. The prefetch accuracy is typically calculated as the number of cache misses eliminated by prefetching divided by a sum of useless cache prefetches and the number of cache misses eliminated by prefetching. Prefetch timeliness is typically a measure of how early a data is prefetched compared to when that data is requested via a memory access request. Prefetches are considered "late" if the corresponding data being prefetched is requested via a memory access request before the prefetcher module is able to finish prefetching the data, such that the prefetched data is not available for retrieval from the cache at the time it is needed. Prefetch lateness is a measure of the quantity of prefetches that are late over a given period. In some embodiments, some or all of these prefetch performance characteristics are calculated using hardware performance counters that are stored and maintained in the processing system 100.

The multi-channel memory interleaving configuration of the processing system 100 affects the maximum prefetch distance and prefetch degree achievable via memory-side cache prefetching performed by prefetcher modules of the cache controllers 118 of the memory-side caches 116. Herein, measures of prefetch distance and prefetch degree are provided in terms of cache lines. For example, a prefetch distance of 8 indicates that a given system is configured to prefetch 8 cache lines ahead of the initial cache line in the memory access request that caused prefetching to be initiated for a given page. For example, a prefetch degree of 15 indicates that a system is configured to prefetch 15 cache lines from a given channel when prefetching data for a given page. In some embodiments, each cache controller 118 is configured to only prefetch data from the memory device 108 that includes that cache controller 118 (the cache controller 118-1 only prefetches data from the memory device 108-1, for example). The prefetch distance indicates how far ahead of the demand access stream the prefetcher module can prefetch data. The prefetch degree indicates how much data (e.g., the number of lines of data) that can be prefetched. For example, returning to the example of an interleaving configuration of [12, 11, 10, 9, 8], given a 64 B cache line and a 4 kB page, a maximum of three next-line prefetches can be made to a given channel of the 32 possible channels across which physical addresses can be mapped, since the first line of data to be accessed is not prefetched and 4 sequential lines of data are stored at each of the 32 channels. This corresponds to a prefetch degree of 3 and a prefetch distance of 1.

The prefetch distance and prefetch degree impact the prefetch performance characteristics in respectively different ways. In some embodiments, prefetch lateness is reduced by increasing the prefetch distance. In some embodiments, prefetch accuracy is increased by reducing the prefetch degree, though potentially at the cost of decreased prefetch coverage. In some embodiments, prefetch coverage is increased by increasing the prefetch degree, though potentially at the cost of decreased prefetch accuracy.

Modifying the interleave configuration of the processing system 100 changes either or both of prefetch distance and the prefetch degree achievable via memory-side cache prefetching performed by prefetcher modules of the cache controllers 118 of the memory-side caches 116. By changing the prefetch distance, the prefetch degree, or both, as described above, corresponding prefetch performance characteristics are modified (e.g., increasing prefetch accuracy, increasing prefetch coverage, decreasing prefetch lateness). Generally, upon modifying the interleaving configuration of the processing system 100, the prefetcher modules of the cache controllers 118 are reconfigured to perform prefetching operations with a prefetch distance and prefetch degree that are within respective ranges of maximum and minimum prefetch distance and maximum prefetch degree allowed by the interleaving configuration of the processing system 100.

In some embodiments, the processor 102 is configured to determine (based on, for example, hardware performance counters used to track prefetch performance characteristics) whether one or more interleaving reconfiguration trigger conditions have been met and to modify the interleaving configuration during, for example, a boot sequence performed at a boot time following the detection of the one or more interleaving reconfiguration trigger conditions by modifying the interleaving configuration data 112. The way in which the processor 102 modifies the interleaving configuration data 112 is based on the one or more detected interleaving reconfiguration trigger conditions. Such interleaving reconfiguration trigger conditions include, for example, high prefetch lateness, low prefetch accuracy, and low prefetch coverage. In some embodiments, the processor 102 detects an interleaving reconfiguration trigger condition of high prefetch lateness by determining that more than a threshold quantity of prefetches are late over a given time period, or in response to determining that more than a threshold percentage of total prefetches are late over a given time period. In some embodiments, the processor 102 detects an interleaving reconfiguration trigger condition of low prefetch accuracy by determining (based on corresponding hardware performance counters, for example) that the prefetch accuracy for the processing system 100 (and, more specifically, for prefetches performed by the cache controllers 118 of the processing system 100) is less than a predetermined threshold value. In some embodiments, the processor 102 detects an interleaving reconfiguration trigger condition of low prefetch coverage by determining (based on corresponding hardware performance counters, for example) that the prefetch coverage for the processing system 100 (and, more specifically, for prefetches performed by the cache controllers 118 of the processing system 100) is less than a predetermined threshold value.

Figure 2:
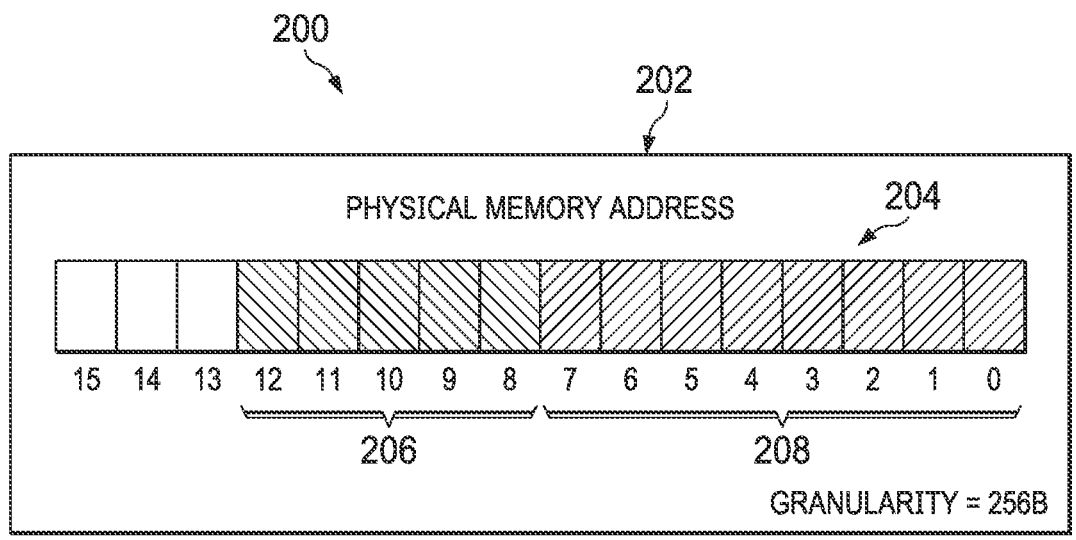
FIG. 2 is a diagram of a representation of a first interleaving configuration, in accordance with some embodiments.

FIG. 2 shows a diagram illustrating a representation of a first interleaving configuration 200 of a processing system. For ease of illustration, the present example is described with respect to an example implementation of the processing system 100 of FIG. 1 and its constituent components and modules.

A physical memory address 202 is shown here to include an array of bits 204, each associated a respective index. In some embodiments the physical memory address 202 (and any other physical memory address being mapped according to the first interleaving configuration 200 of the present example), is mapped to a particular channel of the channels 114 based on the respective values of the binary digits at indices 206 of the given physical memory address. That is, the channel of the channels 114 and, therefore, the memory device of the memory devices 108 used to store and retrieve data associated with the physical memory address 202 is selected by the values of the bits at the indices 206. In some embodiments, the values of the bits at the indices 206 are used to select a channel identifier ("channel ID") number associated with a given channel of the channels 114.

In the present example, the first interleaving configuration 200, which can be denoted as [12, 11, 10, 9, 8], causes the MMU 106 to map the physical memory address 202 to a channel 114 based on binary digits at indices 12, 11, 10, 9, and 8 of the physical memory address 202. That is, the value of the bits of the physical memory address 202 at indices 12, 11, 10, 9, and 8 are used by the MMU 106 to determine a channel ID number corresponding to one of the channels 114 to which the physical memory address 202 is to be mapped. As shown, the lowest order 16 bits of the physical memory address 202 are indexed as [15, 14, 13, 12, 11, 10, 9, 8, 7, 6, 5, 4, 3, 2, 1, 0]. Here, the use of five bits of the physical memory address 202 for selecting the channel ID number, as defined by the interleaving configuration 200, allows physical memory addresses, such as the physical memory address 202, to be mapped across up to 32 channels (i.e., 2^5 channels, since the 5 bits at the bit indices 12, 11, 10, 9, and 8 of the group of bits 206 are used by the MMU 106 to determine the channel ID number). The number of physical memory address bits in the group of bits 208 (which include the group of bits to the right of the group of bits 206) determines the size of each set of sequential physical memory address to be mapped to a given channel. This size is sometimes referred to as the "interleaving granularity" and can be characterized as the maximum number of sequential bytes that are to be stored at each channel before switching to the next channel. Continuing the example, the number of bits included in the group of bits 208, denoted here as [7, 6, 5, 4, 3, 2, 1, 0], determines the interleaving granularity, in bytes, of the interleaving configuration 200. In this example, the interleaving granularity is 256 B (i.e., 2^8 B, since there are 8 bits in the group of bits 208 to the right of the group of bits 206, allowing for 256 combinations of those 8 bits, corresponding to 256 sequential physical memory addresses, and 1 B of data can be stored at each physical memory address). In some of the embodiments described herein, the interleaving configuration 200 is considered an "initial" interleaving configuration for sake of comparison to another interleaving configuration to which the interleaving configuration 200 is modified based on detecting one or more interleaving reconfiguration trigger conditions associated with one or more prefetch performance characteristics.

Figure 3:
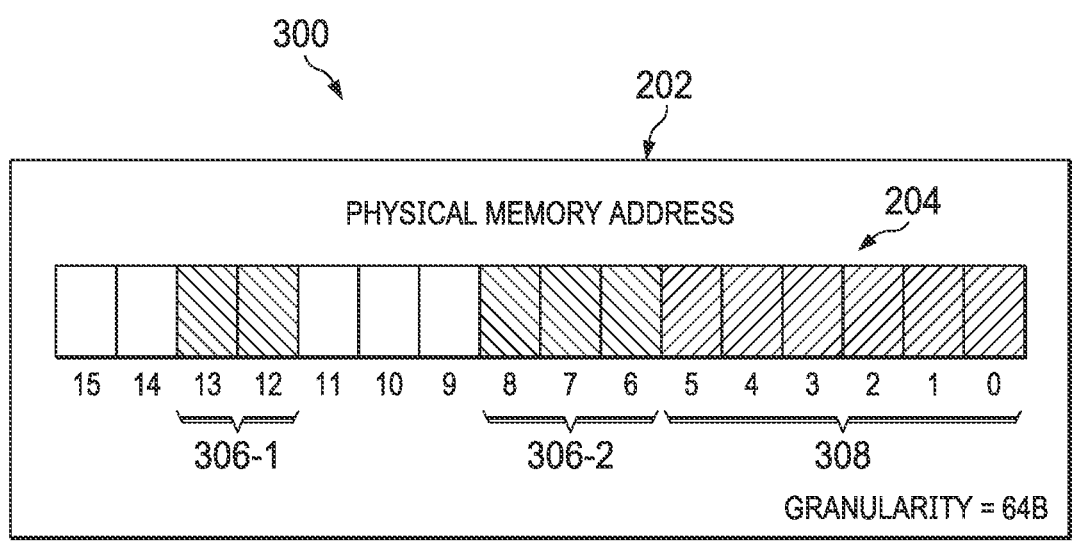
FIG. 3 is a diagram of a representation of a second interleaving configuration, in accordance with some embodiments.

FIG. 3 shows a diagram illustrating a representation of a second interleaving configuration 300 of a processing system. For ease of illustration, the present example is described with respect to an example implementation of the processing system 100 of FIG. 1 and its constituent components and modules and with respect to the interleaving configuration 200 of FIG. 2, with like reference numerals referring to like elements.

In the present example, the modification of the interleaving configuration of the processing system 100 from the first interleaving configuration 200 to a second interleaving configuration 300 is performed by changing the group of bits of the physical memory address 202 that is used by the MMU 106 to map the physical memory address 202 to a particular channel of the channels 114 (e.g., from the group of bits 206 to the group of bits 306).

For example, in response to detecting an interleaving reconfiguration trigger condition indicative of high prefetch lateness, the processor 102 modifies the interleaving configuration data 112 of the configuration registers 110 to change the group of bits used to determine the channel ID number of the channel 114 to which the physical memory address 202 is to be mapped from the group of bits 206 to the group of bits 306. This also decreases the quantity of bits in the group of bits that contribute to interleaving granularity from 8 (since there are 8 bits in the group of bits 208) to 6 (since there are 6 bits in the group of bits 308) and decreases the number of channels across which physical memory addresses of a given 4 kB page are to be mapped from 32 to 8. This change in the interleaving configuration also changes the distance between adjacent sets of sequential physical memory addresses that are both associated with the same page and mapped to the same channel 114 from 124 cache lines worth of sequential physical memory addresses (for example, since 256 B worth of sequential physical memory addresses are mapped to each channel, after mapping 256 B worth of sequential physical memory addresses to a given channel, 7936 B, or 124 64 B cache lines, worth of sequential physical memory addresses would be mapped to the other 31 channels before another 256 B worth of sequential physical memory addresses are mapped to the given channel again) to 7 cache lines worth of sequential physical memory addresses (for example, since 64 B worth of sequential physical memory addresses are mapped to each channel, after mapping 64 B worth of sequential physical memory addresses to a given channel, 448 B, or 7 64 B cache lines, worth of sequential physical memory addresses would be mapped to the other 7 channels before another 64 B worth sequential of physical memory addresses are mapped to the given channel again), such that there are at least two adjacent sets of sequential physical memory addresses mapped to a given channel 114 that are associated with the same page, given a page size of 4 kB. Here, "adjacent sets of physical memory addresses" refers to a first set of sequential physical memory addresses that is mapped to a given channel and a second set of sequential physical memory addresses that mapped to the given channel without any intervening sets of sequential physical memory addresses between the first and second sets (i.e., the first and second sets of sequential physical memory addresses are adjacent with respect to the order in which they are mapped to the given channel of the channels 114). This effectively increases the minimum and maximum prefetch distances achievable by the prefetcher modules of the cache controllers 118. For example, the first interleaving configuration 200 uses the group of bits 206, denoted as [12, 11, 10, 9, 8], for determining the channel ID number to be used to map the physical memory address 202. The processor 102 modifies the interleaving configuration data 112 to have the second interleaving configuration 300, which uses the group of bits 306, denoted as [13, 12, 8, 7, 6], to determine the channel ID number, thereby effectively adjusting the interleaving configuration to map 8 sets of sequential physical memory addresses (corresponding to 8 sequential cache lines, one cache line for each set) across 8 different channels 114 (with a minimum value of 8 for N in the present example) given a 64 B cache line size and a 4 kB page size, resulting in an interleaving granularity of 64 B. Here, the groups of bits 306-1 and 306-2 collectively represent the number of channels (i.e., 2^5=32 channels, since there are 32 possible combinations of the 5 bits at bit indices 13, 12, 8, 7, and 6 of the group of bits 306 that are used by the MMU 106 to determine the channel ID number), across which physical addresses are to be mapped and are used as a hash that determines a 5 digit channel ID number associated with each physical address. The group of bits 306-2 determines how many channels are cycled through for a given set of contiguous physical addresses corresponding to a given 4 kB page (a set of eight channels, in the present example). The number of bits between the group of bits 306-1 and the group of bits 306-2 (i.e., the three bits at bit indices 9, 10 and 11) are excluded from the hash represented by the groups of bits 306 and determine how many times a given set of channels (e.g., with each set including 8 channels, in the present example, since there are 3 bits in the group of bits 306, allowing for 2^3=8 possible combinations and, therefore, 8 channels) is cycled through before proceeding to a next set of 8 channels, when mapping sequential physical addresses to channels, before proceeding to the next set of channels. In the present example, one cache line worth of sequential physical addresses is mapped to each channel of a first set of eight channels (e.g., channels 0 to 7) during each cycle of a set of eight cycles (i.e., 2^3=8 cycles, since the three bits at bit indices 9, 10, and 11 determine the number of cycles). Then, once bit 12 is incremented, which in this case corresponds to the start of a new 4 kB page, the processor 102 begins mapping sequential physical addresses to a second set of eight channels (e.g., channels 8-15), and so on.

In this example, the second interleaving configuration 300 allows each cache controller 118 to prefetch 7 total cache lines with a minimum prefetch distance of 8. For example, when prefetching 7 cache lines (non-sequential cache lines, in this case) with a prefetch distance of 8, given a 4 kB page, and considering cache line "0" to be the cache line requested in an initial memory access request, cache lines 8, 16, 24, 32, 40, 48, and 56 are prefetched by the first cache controller 118-1 and are stored in the first memory-side cache 116-1. Here, for example, each set of sequential physical addresses mapped to the first channel 114-1 of the channels 114 (and therefore potentially prefetchable by the first cache controller 118-1) corresponds to the size of a single cache line (i.e., 64B in the present example), and there is a distance of 7 cache lines (i.e., 448B) worth of sequential physical addresses between adjacent sets of sequential physical addresses (e.g., with both sets being associated with the same 4 kB page) that are mapped to the first channel 114-1. Continuing the example, cache lines 9, 17, 25, 33, 41, 49, and 57 are prefetched by the second controller 118-2 and are stored in the second memory-side cache 116-2, and so on. The distance between adjacent sets of sequential physical addresses (e.g., with both sets being associated with the same 4 kB page) mapped to the second channel 114-2 is also 7 cache lines (i.e., 448B) worth of sequential physical addresses. In contrast, the distance between sequential sets of physical addresses mapped to a given channel using the first interleaving configuration 200 corresponds to around 128 cache lines (i.e., 8192B) worth of sequential physical addresses, which is larger than the 4 kB page size of the present example. So, the maximum prefetch distance achievable by a given prefetcher module, when the first interleaving configuration 200 is implemented, is limited to, at most, 3 cache lines due to the interleaving granularity of 4 cache lines Compared to the first interleaving configuration 200, the second interleaving configuration 300 implicitly builds a higher maximum prefetch distance (a maximum prefetch distance of 56 cache lines instead of 3 cache lines) and a higher minimum prefetch distance for each channel (e.g., 8 cache lines instead of 1 cache line) for each channel 114, which advantageously improves prefetch timeliness (by reducing prefetch lateness) without loss of prefetch coverage.

Figure 4:
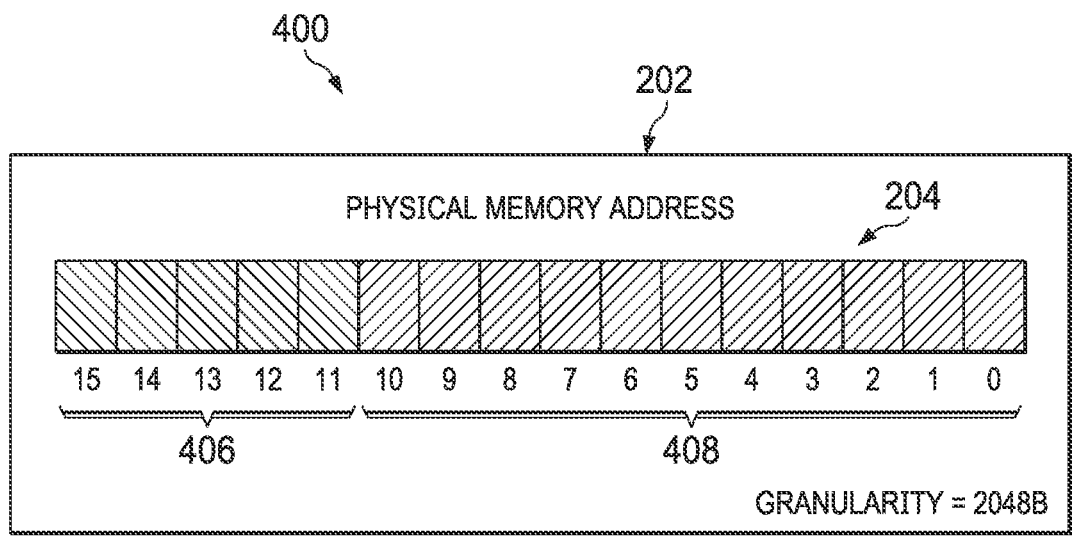
FIG. 4 is a diagram of a representation of a third interleaving configuration, in accordance with some embodiments.

FIG. 4 shows a diagram illustrating a representation of a third interleaving configuration 400 of a processing system. For ease of illustration, the present example is described with respect to an example implementation of the processing system 100 of FIG. 1 and its constituent components and modules and with respect to the interleaving configuration 200 of FIG. 2, with like reference numerals referring to like elements.

In the present example, the modification of the interleaving configuration of the processing system 100 from the first interleaving configuration 200 to a third interleaving configuration 400 is performed by changing the group of bits of the physical memory address 202 that are used by the MMU 106 to map the physical memory address 202 to a particular channel of the channels 114 (e.g., from the group of bits 206 to the group of bits 406).

For example, in response to detecting an interleaving reconfiguration trigger condition indicative of low prefetch coverage, the processor 102 modifies the interleaving configuration data 112 of the configuration registers 110 to increase the order of the bit indices of the group of bits used to determine the channel ID number of the channel 114 to which the physical memory address 202 is to be mapped from the group of bits 206 to the group of bits 406. This also increases the quantity of bits of the group of bits used to determine the interleaving granularity 256B (given the 8 bits included in the group of bits 208) to 2048B (given the 11 bits included in the group of bits 408). Increasing the interleaving granularity in this way effectively increases the prefetch degree achievable by the prefetcher modules of the cache controllers 118. For example, given an example in which the processor 102 modifies the interleaving configuration defined by the interleaving configuration data 112 from the first interleaving configuration 200, with group of bits 206, denoted as [12, 11, 10, 9, 8], used to determine the channel ID number, to the third interleaving configuration 400, with group of bits 406, denoted as [15, 14, 13, 12, 11], used to determine the channel ID number and group of bits 408, denoted as [10, 9, 8, 7, 6, 5, 4, 3, 2, 1, 0], defining the interleaving granularity. The third interleaving configuration 400 maps a set of sequential physical memory addresses corresponding to 32 sequential cache lines to a single channel of the channels 114 before beginning to assign physical memory addresses to a subsequent channel of the channels, compared to the first interleaving configuration 200, which only maps a set of sequential physical memory addresses corresponding to 4 sequential cache lines to a single channel, given a 64B cache line and 4 kB page size. Thus, by changing from the first interleaving configuration 200 to the third interleaving configuration 400, the interleaving granularity is increased, which also increases the prefetch degree achievable by the prefetcher modules of the cache controllers 118. For the third interleaving configuration 400, an interleaving granularity of 2048 B is achieved across 32 channels (with the channel ID number being determined based on the values of the bits of the group of bits 406; with a minimum value of 32 for N in the present example), given a 64 B cache line size and a 4 kB page size. In this case, a single 4 kB page is prefetched across only two channels 114 due to the increased interleaving granularity. In this example, the third interleaving configuration 400 allows each cache controller 118 to prefetch up to 31 cache lines (sequential cache lines, in this case) with a prefetch distance of 1. For example, when prefetching 31 cache lines with a prefetch distance of 1 to a 4 kB page and considering cache line "0" to be the cache line requested in an initial memory access request, cache lines 1 through 31 are prefetched by the first cache controller 118-1 and are stored in the first memory-side cache 116-1. Continuing the example, cache lines 32 through 63 are prefetched by the second controller 118-2 and are stored in the second memory-side cache 116-2, and so on. Alternatively, the third interleaving configuration 400 allows each cache controller 118 to prefetch up to 24 cache lines with a prefetch distance of 8.

Compared to the first interleaving configuration 200, the third interleaving configuration 400 implicitly builds a higher maximum prefetch degree for each channel 114 (a maximum prefetch degree of 31 cache lines instead of 3 cache lines), which advantageously improves prefetch coverage and prefetch timeliness, It should be noted that, in other embodiments, the processor 102, in response to detecting an interleaving reconfiguration trigger condition indicative of low prefetch accuracy, decreases the prefetch degree by decreasing the interleaving granularity (e.g., by changing the interleaving configuration from the third interleaving configuration 400 to the first interleaving configuration 200) to allow fewer sequential lines to map to each memory channel, which advantageously improves prefetch accuracy.

Figure 5:
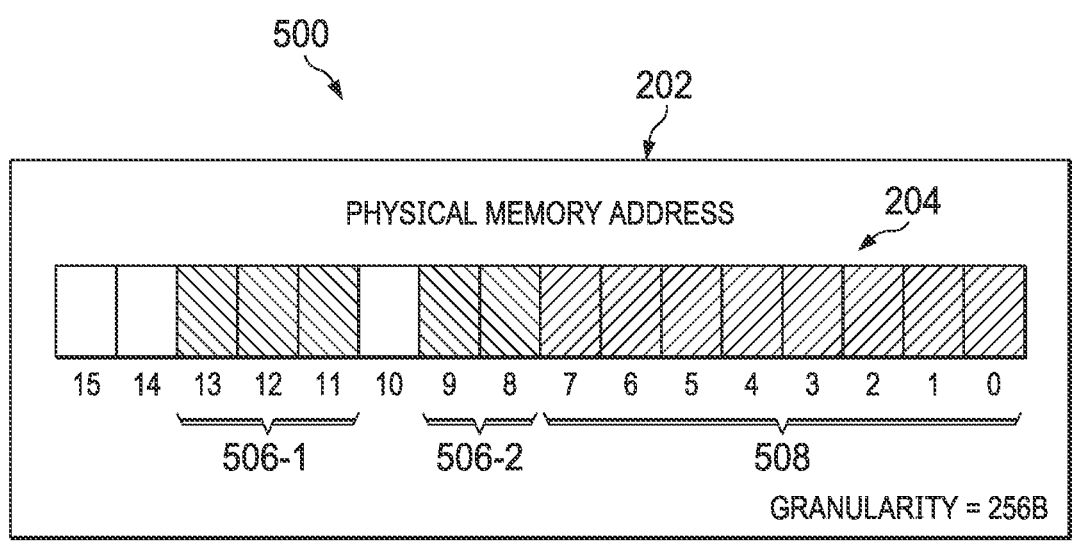
FIG. 5 is a diagram of a representation of a fourth interleaving configuration, in accordance with some embodiments.

FIG. 5 shows a diagram illustrating a representation of a fourth interleaving configuration 500 of a processing system. For ease of illustration, the present example is described with respect to an example implementation of the processing system 100 of FIG. 1 and its constituent components and modules and with respect to the interleaving configuration 200 of FIG. 2, with like reference numerals referring to like elements.

In the present example, the modification of the interleaving configuration of the processing system 100 from the first interleaving configuration 200 to a fourth interleaving configuration 500 is performed by changing the group of bits of the physical memory address 202 that are used by the MMU 106 to map the physical memory address 202 to a particular channel of the channels 114 (e.g., from the group of bits 206 to the group of bits 506).

For example, in response to detecting both a first interleaving reconfiguration trigger condition indicative of high prefetch lateness and a second interleaving reconfiguration trigger condition indicative of low prefetch coverage, the processor 102 modifies the interleaving configuration data 112 of the configuration registers 110 change the group of bits used to determine the channel ID number of the channel 114 to which the physical memory address 202 is to be mapped from the group of bits 206 to the group of bits 506. In the present example, the fourth interleaving configuration 500 maintains the interleave granularity by keeping the group of bits 508 the same as the group of bits 208, and decreases the number of channels 114 across which the physical memory addresses are to be mapped. This change in the interleaving configuration also changes the distance between adjacent sets of sequential physical memory addresses that are both associated with the same page and mapped to the same channel 114 from 124 cache lines worth of sequential physical memory addresses to 12 cache lines worth of sequential physical memory addresses, such that there are at least two adjacent sets of sequential physical memory addresses mapped to a given channel 114 that are associated with the same page, given a page size of 4 kB. This effectively increases the prefetch distance and the prefetch degree achievable by the prefetcher modules of the cache controllers 118. For example, the fourth interleaving configuration 500 maps 4 sequential cache lines to the same channel before moving to the next channel. Here, the groups of bits 506-1 and 506-2, denoted as [13, 12, 11, 9, 8], collectively represent the number of channels across which physical addresses are to be mapped (i.e., $2^5=32$ channels), and are used as a hash that determines a 5 digit channel ID number associated with each physical address. The group of bits 506-2 determines how many channels are cycled through for a given set of contiguous physical addresses corresponding to a given 4 kB page (a set of four channels, in the present example). Bit 10, which is excluded from the hash represented by the groups of bits 506, determines how many times a given set of channels (e.g., a given set of 4 channels, in the present example) is cycled through, when mapping sequential physical addresses to channels, before proceeding to the next set of channels. In the present example, four cache lines worth of sequential physical addresses is mapped to each channel of a first set of four channels (e.g., channels 0 to 3) during each cycle of a set of two cycles (i.e., $2^1=2$ cycles, since a single bit, bit 10, determines the number of cycles). Then, once bit 11 is incremented, which in this case occurs after 2 kB worth of physical addresses are mapped to the first set of channels, the processor 102 begins mapping sequential physical addresses to a second set of four channels (e.g., channels 4-7), and so on.

For the fourth interleaving configuration 500, an interleaving granularity of 256 B is achieved, and the physical addresses associated with a given 4 kB page are mapped across 8 channels, given a 64 B cache line size and a 4 kB page size. In this example, the new interleaving configuration allows each cache controller 118 to prefetch up to 7 total cache lines of a given 4 kB page with a prefetch distance of 1. Alternatively, the new interleaving configuration also allows each cache controller 118 to prefetch up to 1 cache line of a given 4 kB page with a prefetch distance of 16. For example, when prefetching groups of 4 sequential cache lines with a prefetch distance of 1 to a 4 kB page, using the fourth interleaving configuration 500, and considering cache line "0" to be the cache line requested in an initial memory access request, cache lines 1:3 and 16:19, are prefetched by the first cache controller 118-1 and are stored in the first memory-side cache 116-1. Continuing the example, cache lines 4:7 and 20:23 are prefetched by the second controller 118-2 and are stored in the second memory-side cache 116-2, and so on. Alternatively, on an initial access to cache line "0", cache line "16" could be prefetched while on an initial access to cache line "1", cache lines "17" could be prefetched and so on. Compared to the first interleaving configuration 200, the fourth interleaving configuration 500 implicitly builds a higher maximum prefetch distance (an increase from 3 to 19 in the present example), and higher maximum prefetch degree (an increase from 3 to 7 in the present example) for each channel 114, which advantageously improves prefetch timeliness (by reducing prefetch lateness) while also improving prefetch coverage.

Figure 6:
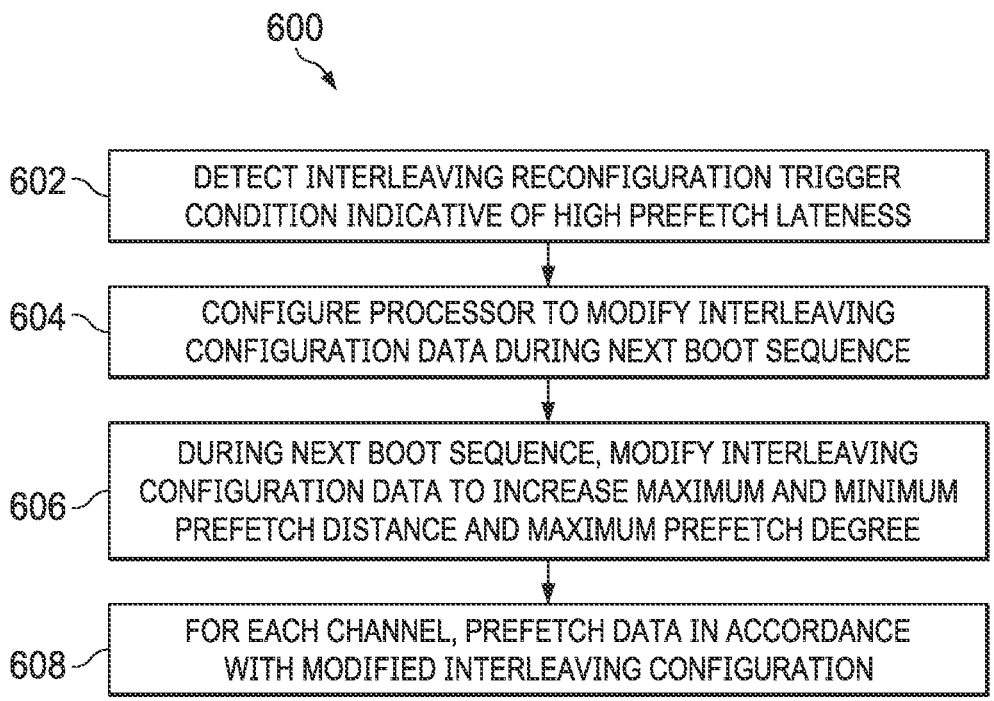
FIG. 6 is a flow diagram illustrating a method of dynamic interleaving configuration modification that effectively increases the prefetch distance of prefetches performed using memory-side caches by modifying interleaving configuration data in response to an interleaving reconfiguration trigger condition, in accordance with some embodiments.

FIG. 6 illustrates a method 600 of coordinating modification of an interleaving configuration of a processing system with memory-side prefetching of the processing system in response to detecting high prefetch lateness. For ease of illustration, the method 600 is described with respect to an example implementation of the processing system 100 of FIG. 1 and its constituent components and modules. In some embodiments, the processing system 100 performs the method 600, at least in part, via execution of computer-readable instructions at the processor 102 and the cache controllers 118.

At block 602, the processor 102 detects an interleaving reconfiguration trigger condition that is indicative of high prefetch lateness. In some embodiments, such an interleaving reconfiguration trigger condition is identified in response to determining that more than a threshold quantity of prefetches are late over a given time period, or in response to determining that more than a threshold percentage of total prefetches are late over a given time period.

At block 604, in response to detecting the interleaving reconfiguration trigger condition, the processor 102 is configured to modify the interleaving configuration data 112 during a "next" boot sequence (that is, during a boot sequence of a boot time following the time period in which the interleaving reconfiguration trigger condition was detected).

At block 606, during the next boot sequence, the processor 102 modifies the interleaving configuration data 112 to define a new interleaving configuration for the processing system 100 (based on the prefetch performance characteristics indicated by the interleaving reconfiguration trigger condition) to increase the minimum distance between adjacent sets of physical memory addresses that are mapped to a single channel of the channels 114. This effectively increases the maximum and minimum prefetch distances and the maximum prefetch degree achievable by the prefetcher modules of the cache controllers 118. In some embodiments, the new interleaving configuration causes M sequential cache lines to be mapped to respectively different channels, where M is greater or equal to 4, which implicitly increases the prefetch distance, of prefetch operations performed by each of the prefetcher modules of the cache controllers 118. For example, given an initial interleaving configuration of [12, 11, 10, 9, 8] (e.g., the first interleaving configuration 200 of FIG. 2), the processor 102 modifies the interleaving configuration data 112 to have a new interleaving configuration of [13, 12, 8, 7, 6] (e.g., the second interleaving configuration 300 of FIG. 3), thereby effectively adjusting the interleaving configuration to map 8 sequential lines across 8 different channels 114 in each cycle of 8 cycles, and effectively increasing the maximum prefetch distance (from 3 to 56), the minimum prefetch distance (from 1 to 8), and maximum prefetch degree (from 3 to 7) achievable by the prefetcher modules, without loss of prefetch coverage.

At block 608, the prefetch modules of the cache controllers 118 prefetch data (e.g., cache lines) in accordance with the modified interleaving configuration. That is, each prefetcher module of the cache controllers 118 is respectively configured to prefetch data with a prefetch degree and prefetch distance that is within respective ranges of maximum prefetch degree and the maximum and minimum prefetch distance that are achievable given the new interleaving configuration.

Figure 7:
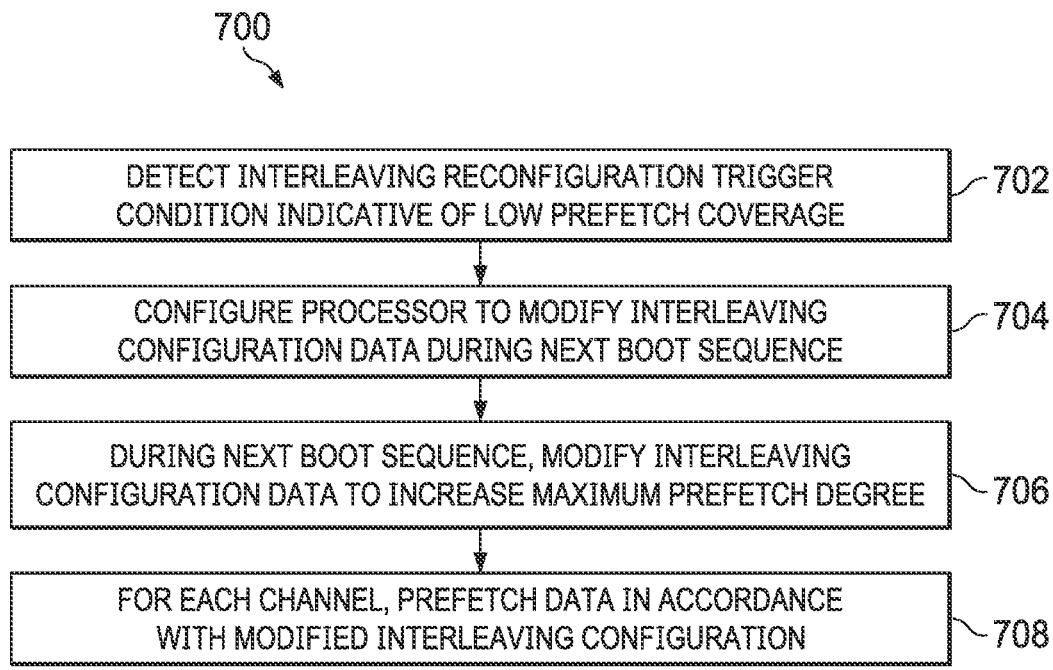
FIG. 7 is a flow diagram illustrating a method of dynamic interleaving configuration modification that effectively increases the prefetch degree of prefetches performed using memory-side caches by modifying interleaving configuration data in response to an interleaving reconfiguration trigger condition, in accordance with some embodiments.

FIG. 7 illustrates a method 700 of coordinating modification of an interleaving configuration of a processing system with memory-side prefetching of the processing system in response to detecting high prefetch lateness. For ease of illustration, the method 700 is described with respect to an example implementation of the processing system 100 of FIG. 1 and its constituent components and modules. In some embodiments, the processing system 100 performs the method 700, at least in part, via execution of computer-readable instructions at the processor 102 and the cache controllers 118.

At block 702, the processor 102 detects an interleaving reconfiguration trigger condition that is indicative of low prefetch coverage. In some embodiments, such an interleaving reconfiguration trigger condition is identified in response to determining (based on corresponding hardware performance counters, for example) that the prefetch coverage for the processing system 100 (and, more specifically, for prefetches performed by the cache controllers 118 of the processing system 100) is less than a predetermined threshold value.

At block 704, in response to detecting the interleaving reconfiguration trigger condition, the processor 102 is configured to modify the interleaving configuration data 112 during a "next" boot sequence (that is, during a boot sequence of a boot time following the time period in which the interleaving reconfiguration trigger condition was detected).

At block 706, during the next boot sequence, the processor 102 modifies the interleaving configuration data 112 to define a new interleaving configuration for the processing system 100 (based on the prefetch performance characteristics indicated by the interleaving reconfiguration trigger condition) to increase the interleaving granularity by increasing the quantity of sequential physical memory addresses that are included in each set of sequential physical memory addresses respectively mapped to each channel 114. This effectively increases the maximum prefetch degree achievable by the prefetcher modules of the cache controllers 118, which increases prefetch coverage and prefetch timeliness. For example, the processor 102 modifies the interleaving configuration data 112 to define a new interleaving configuration having an increased interleaving granularity, thereby implicitly increasing the number of sequential cache lines that can be prefetched by each prefetcher module of the cache controllers 118. For example, given an initial interleaving configuration of [12, 11, 10, 9, 8] (e.g., the first interleaving configuration 200 of FIG. 2), the processor 102 modifies the interleaving configuration data 112 to have a new interleaving configuration of [15, 14, 13, 12, 11] (e.g., the third interleaving configuration 400 of FIG. 4), thereby effectively adjusting the interleaving configuration to map 31 sequential lines to a single channel of the channels 114 before moving to the next channel and, accordingly, increasing the maximum prefetch degree (from 3 to 31) achievable by each prefetcher module.

At block 708, the prefetch modules of the cache controllers 118 prefetch data (e.g., cache lines) in accordance with the modified interleaving configuration. That is, each prefetcher module of the cache controllers 118 is respectively configured to prefetch data with a prefetch degree and prefetch distance that is within respective ranges of maximum and minimum prefetch degree and prefetch distance that are achievable given the new interleaving configuration.

Figure 8:
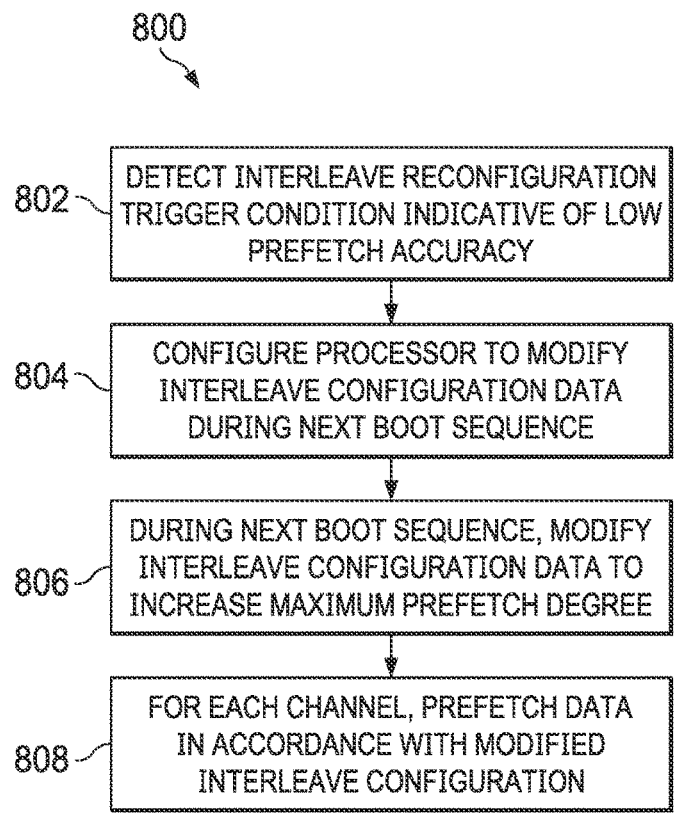
FIG. 8 is a flow diagram illustrating a method of dynamic interleaving configuration modification that effectively decreases the prefetch degree of prefetches performed using memory-side caches by modifying interleaving configuration data in response to an interleaving reconfiguration trigger condition, in accordance with some embodiments.

FIG. 8 illustrates a method 800 of coordinating modification of an interleaving configuration of a processing system with memory-side prefetching of the processing system in response to detecting high prefetch lateness. For ease of illustration, the method 800 is described with respect to an example implementation of the processing system 100 of FIG. 1 and its constituent components and modules. In some embodiments, the processing system 100 performs the method 800, at least in part, via execution of computer-readable instructions at the processor 102 and the cache controllers 118.

At block 802, the processor 102 detects an interleaving reconfiguration trigger condition that is indicative of low prefetch accuracy. In some embodiments, the processor 102 detects an interleaving reconfiguration trigger condition of low prefetch accuracy by determining (based on corresponding hardware performance counters, for example) that the prefetch accuracy for the processing system 100 (and, more specifically, for prefetches performed by the cache controllers 118 of the processing system 100) is less than a predetermined threshold value.

At block 804, in response to detecting the interleaving reconfiguration trigger condition, the processor 102 is configured to modify the interleaving configuration data 112 during a "next" boot sequence (that is, during a boot sequence of a boot time following the time period in which the interleaving reconfiguration trigger condition was detected).

At block 806, during the next boot sequence, the processor 102 modifies the interleaving configuration data 112 to define a new interleaving configuration for the processing system 100 (based on the prefetch performance characteristics indicated by the interleaving reconfiguration trigger condition) to decrease the interleaving granularity by decreasing the quantity of sequential physical memory addresses that are included in each set of sequential physical memory addresses respectively mapped to each channel 114. This effectively decreases the maximum prefetch degree achievable by the prefetcher modules of the cache controllers 118. For example, the processor 102 modifies the interleaving configuration data 112 to define a new interleaving configuration having a decreased interleaving granularity, thereby implicitly decreasing the number of sequential cache lines that can be prefetched by each prefetcher module of the cache controllers 118. For example, given an initial interleaving configuration of [15, 14, 13, 12, 11] (e.g., the third interleaving configuration 400 of FIG. 4), the processor 102 modifies the interleaving configuration data 112 to have a new interleaving configuration of [12, 11, 10, 9, 8] (e.g., the first interleaving configuration 200 of FIG. 2), thereby effectively adjusting the interleaving configuration to map 3 sequential lines with a prefetch distance of 1 to a single channel of the channels 114 before moving to the next channel and, accordingly, decreasing the maximum prefetch degree (from 31 to 3) achievable by each prefetcher module. This results in improved prefetch accuracy of the system.

At block 808, the prefetch modules of the cache controllers 118 prefetch data (e.g., cache lines) in accordance with the modified interleaving configuration. That is, each prefetcher module of the cache controllers 118 is respectively configured to prefetch data with a prefetch degree and prefetch distance that is within respective ranges of maximum and minimum prefetch degree and prefetch distance that are achievable given the new interleaving configuration.

Figure 9:
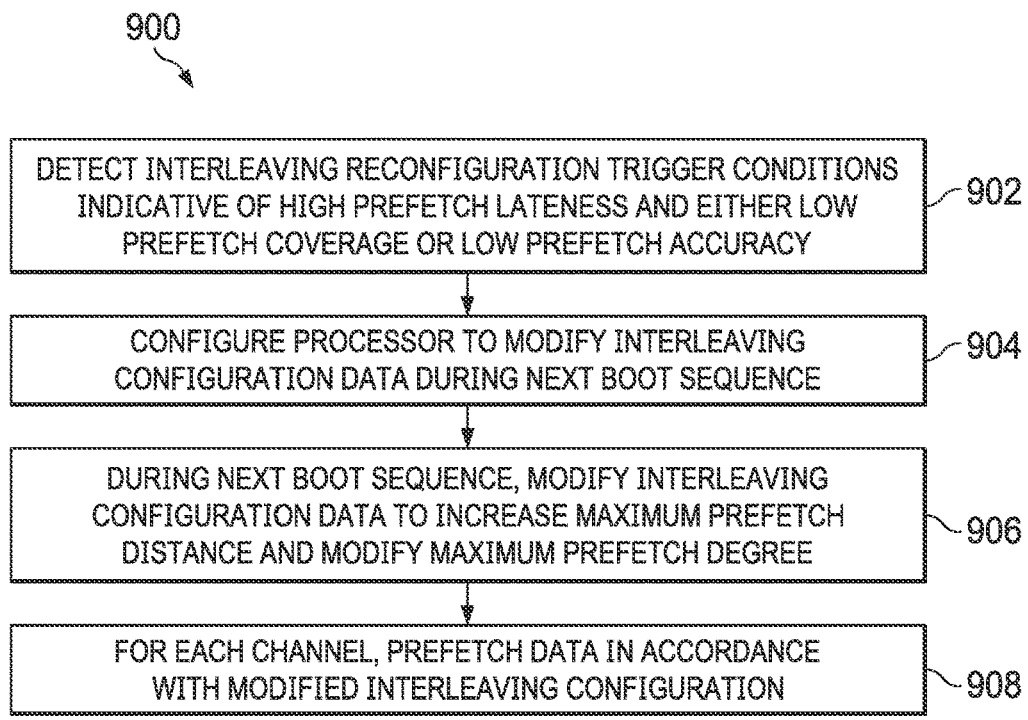
FIG. 9 is a flow diagram illustrating a method of dynamic interleaving configuration modification that effectively increases the prefetch distance and modifies the prefetch degree of prefetches performed using memory-side caches by modifying interleaving configuration data in response to first and second interleaving reconfiguration trigger conditions, in accordance with some embodiments.

FIG. 9 illustrates a method 900 of coordinating modification of an interleaving configuration of a processing system with memory-side prefetching of the processing system in response to detecting high prefetch lateness and either low prefetch accuracy or low prefetch coverage. For ease of illustration, the method 900 is described with respect to an example implementation of the processing system 100 of FIG. 1 and its constituent components and modules. In some embodiments, the processing system 100 performs the method 900, at least in part, via execution of computer-readable instructions at the processor 102 and the cache controllers 118.

At block 902, the processor 102 detects a first interleaving reconfiguration trigger condition that is indicative of high prefetch lateness and a second interleaving reconfiguration trigger condition that is indicative of either high prefetch coverage or low prefetch accuracy.

At block 904, in response to detecting the first and second interleaving reconfiguration trigger conditions, the processor 102 is configured to modify the interleaving configuration data 112 during a "next" boot sequence (that is, during a boot sequence of a boot time following the time period in which the interleaving reconfiguration trigger condition was detected).

At block 906, during the next boot sequence, the processor 102 modifies the interleaving configuration data 112 to define a new interleaving configuration for the processing system 100 (based on the prefetch performance characteristics indicated by the first and second interleaving reconfiguration trigger conditions) to increase the minimum distance between adjacent sets of physical memory addresses that are mapped to a single channel of the channels 114 and to modify the interleaving granularity by modifying the quantity of sequential physical memory addresses that are included in each set of sequential physical memory addresses respectively mapped to each channel 114. This effectively increases the maximum prefetch distance and effectively modifies the maximum prefetch degree achievable by the prefetcher modules of the cache controllers 118.

For an example in which the second interleaving reconfiguration trigger condition is indicative of low prefetch coverage, given an initial interleaving configuration of [12, 11, 10, 9, 8] (e.g., the first interleaving configuration 200 of FIG. 2), the processor 102 modifies the interleaving configuration data 112 to have a new interleaving configuration of [13 12, 11, 9, 8] (e.g., the fourth interleaving configuration 500 of FIG. 5), thereby adjusting the interleaving configuration to map 4 sets of 4 sequential cache lines across a first set of 4 channels 114 in each cycle of a set of two cycles, then mapping another 4 sets of 4 sequential cache lines across a second set of 4 channels 114 in each cycle of a set of two cycles, given a 4 kB page size and 64 B cache line size. This effectively increases the maximum prefetch distance (from 3 to 19), the minimum prefetch distance from 1 to 4, and the maximum prefetch degree (from 3 to 4) achievable by the prefetcher modules.

For another example in which the second interleaving reconfiguration trigger condition is indicative of low prefetch accuracy, given an initial interleaving configuration of [14, 13, 12, 11, 10], the processor 102 modifies the interleaving configuration data 112 to have a new interleaving configuration of [13 12, 11, 87, 6], (e.g., the second interleaving configuration 300 of FIG. 3) thereby effectively adjusting the interleaving configuration to map 2 sets of 4 sequential cache lines across 2 different channels 114 over 4 cycles for a given 4 kB page, and effectively increasing the maximum prefetch distance (from 15 to 56), effectively increasing the minimum prefetch distance (from 1 to 4) and effectively decreasing the maximum prefetch degree (from 15 to 7) achievable by the prefetcher modules.

At block 908, the prefetch modules of the cache controllers 118 prefetch data (e.g., cache lines) in accordance with the modified interleaving configuration. That is, each prefetcher module of the cache controllers 118 is respectively configured to prefetch data with a prefetch degree and prefetch distance that is within respective ranges of maximum prefetch degree and maximum and minimum prefetch distance that are achievable given the new interleaving configuration.

In some embodiments, the apparatus and techniques described above are implemented in a system including one or more integrated circuit (IC) devices (also referred to as integrated circuit packages or microchips), such as the processing system 100 described above with reference to FIG. 1. Electronic design automation (EDA) and computer-aided design (CAD) software tools may be used in the design and fabrication of these IC devices. These design tools typically are represented as one or more software programs. The one or more software programs include code executable by a processing system to manipulate the processing system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a processing system during use to provide instructions and/or data to the processing system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the processing system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   detecting an interleaving reconfiguration trigger condition based on at least one prefetch performance characteristic; and
   modifying, responsive to detecting the interleaving reconfiguration trigger condition, an interleaving configuration of a processing system, the interleaving configuration representing a mapping of physical memory addresses to memory devices via respective channels of a plurality of channels.

2. The method of claim 1, further comprising:
   prefetching, with at least one prefetcher module, data in accordance with respective ranges of prefetch distance and prefetch degree achievable with the modified interleaving configuration.

3. The method of claim 2, wherein the interleaving reconfiguration trigger condition is indicative of a low prefetch accuracy of the at least one prefetcher module.

4. The method of claim 2, wherein the interleaving reconfiguration trigger condition is indicative of a low prefetch coverage of the at least one prefetcher module.

5. The method of claim 2, wherein the interleaving reconfiguration trigger condition is indicative of a high prefetch lateness of the at least one prefetcher module.

6. The method of claim 2, wherein the interleaving reconfiguration trigger condition comprises a first interleaving reconfiguration trigger condition that is indicative of a high prefetch lateness of the at least one prefetcher module and a second interleaving reconfiguration trigger condition that is indicative of a low prefetch coverage or a low prefetch accuracy of the at least one prefetcher module.

7. A processing system comprising:
   a processor, the processor configured to execute computer-readable instructions that, when executed, cause the processor to:
   detect an interleaving reconfiguration trigger condition based on at least one prefetch performance characteristic; and
   modify, responsive to detecting the interleaving reconfiguration trigger condition, an interleaving configuration representing a mapping of physical memory addresses to memory devices.

8. The processing system of claim 7, further comprising:
   at least one memory module comprising:
   at least one memory-side cache; and
   at least one cache controller coupled to the at least one memory-side cache and coupled to the processor, the at least one cache controller configured to implement a prefetcher module, and the at least one prefetch performance characteristic being representative of prefetch performance of the prefetcher module.

9. The processing system of claim 8, wherein the prefetcher module is configured to:
   prefetch data from the at least one memory module in accordance with respective ranges of prefetch distance and prefetch degree achievable with the modified interleaving configuration.

10. The processing system of claim 8, wherein the interleaving reconfiguration trigger condition is indicative of a low prefetch accuracy of the prefetcher module.

11. The processing system of claim 8, wherein the interleaving reconfiguration trigger condition is indicative of a low prefetch coverage of the prefetcher module.

12. The processing system of claim 8, wherein the interleaving reconfiguration trigger condition is indicative of a high prefetch lateness of the prefetcher module.

13. The processing system of claim 8, wherein the interleaving reconfiguration trigger condition comprises a first interleaving reconfiguration trigger condition that is indicative of a high prefetch lateness of the prefetcher module and a second interleaving reconfiguration trigger condition that is indicative of a low prefetch coverage or a low prefetch accuracy of the prefetcher module.

14. The processing system of claim 8, wherein the processor comprises:
   at least one configuration register configured to store interleaving configuration data, wherein the processor is configured to modify the interleaving reconfiguration by modifying the interleaving configuration data.

15. A processor comprising:
   at least one configuration register configured to store interleaving configuration data that defines an interleaving configuration for a processing system, the interleaving configuration representing a mapping of physical memory addresses to memory devices via respective channels of a plurality of channels, and the processor being configured to execute computer-readable instructions that, when executed, cause the processor to:
   detect an interleaving reconfiguration trigger condition based on at least one prefetch performance characteristic; and
   modify, responsive to detecting the interleaving reconfiguration trigger condition, the interleaving configuration by modifying the interleaving configuration data based on the interleaving reconfiguration trigger condition.

16. The processor of claim 15, wherein the interleaving reconfiguration trigger condition is indicative of a low prefetch accuracy of at least one prefetcher module.

17. The processor of claim 15, wherein the interleaving reconfiguration trigger condition is indicative of a low prefetch coverage of at least one prefetcher module.

18. The processor of claim 15, wherein the interleaving reconfiguration trigger condition is indicative of a high prefetch lateness of at least one prefetcher module.

19. The processor of claim 15, wherein the interleaving reconfiguration trigger condition comprises a first interleaving reconfiguration trigger condition that is indicative of a high prefetch lateness of at least one prefetcher module and a second interleaving reconfiguration trigger condition that is indicative of a low prefetch coverage or a low prefetch accuracy of the at least one prefetcher module.

20. The processor of claim 15, wherein the computer-readable instructions, when executed, further cause the processor to:
- modify the interleaving configuration by modifying the interleaving configuration during a boot sequence following detection of the interleaving reconfiguration trigger condition.

* * * * *